United States Patent [19]

Ninomiya et al.

[11] Patent Number: 4,529,661
[45] Date of Patent: Jul. 16, 1985

[54] MAGNETIC RECORDING MEDIUM

[75] Inventors: Yoshinobu Ninomiya, Monou; Akira Hashimoto, Tagajo, both of Japan

[73] Assignee: Sony Corporation, Tokyo, Japan

[21] Appl. No.: 598,275

[22] PCT Filed: Jul. 1, 1983

[86] PCT No.: PCT/JP83/00210
§ 371 Date: Mar. 1, 1984
§ 102(e) Date: Mar. 1, 1984

[87] PCT Pub. No.: WO84/00240
PCT Pub. Date: Jan. 19, 1984

[30] Foreign Application Priority Data

Jul. 1, 1982 [JP] Japan .................... 57-114719

[51] Int. Cl.³ .............................. G11B 5/70
[52] U.S. Cl. .................. 428/425.9; 427/128; 427/131; 360/134; 360/135; 360/136; 252/62.54; 428/328; 428/329; 428/694; 428/900
[58] Field of Search ............ 428/694, 900, 425.9, 428/328, 329, 695; 427/44, 128, 131; 252/62.54; 360/134–136

[56] References Cited

U.S. PATENT DOCUMENTS

| | | | |
|---|---|---|---|
| 3,865,627 | 2/1975 | Roden | 428/900 |
| 4,074,012 | 2/1978 | Heikkuren | 428/328 |
| 4,273,807 | 6/1981 | Berry | 427/128 |
| 4,404,253 | 9/1983 | Kohler | 428/694 |
| 4,407,901 | 10/1983 | Miyatsuka | 428/407 |
| 4,411,957 | 10/1983 | Tokuda | 428/425.9 |
| 4,415,630 | 11/1983 | Kubota | 428/522 |
| 4,420,531 | 12/1983 | Tokuda | 428/328 |
| 4,431,712 | 2/1984 | Matsufuji | 428/694 |
| 4,439,486 | 3/1984 | Yamada | 428/900 |
| 4,448,848 | 5/1984 | Okita | 427/44 |
| 4,451,531 | 6/1984 | Isobe | 427/44 |
| 4,455,345 | 6/1984 | Miyatuka | 428/900 |
| 4,465,737 | 8/1984 | Miyatuka | 428/900 |

Primary Examiner—Ellis P. Robinson
Attorney, Agent, or Firm—Hill, Van Santen, Steadman & Simpson

[57] ABSTRACT

A magnetic recording medium has, on a nonmagnetic support, a magnetic layer consisting mainly of an acicular iron oxide magnetic powder and a binder. In order to improve the S/N ratio, a fine magnetic powder having a specific surface area as determined by the BET method, of not less than 35 m²/g is used. In order to improve the dispersibility of the magnetic powder and to improve the squareness ratio and durability thereof, the binder contains a resin which has a molecular weight of not more than 50,000 and has at least one polar group selected from the group consisting of polar groups having the general formulas:

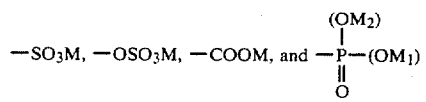

(wherein M is hydrogen, lithium, sodium or potassium; and $M_1$ and $M_2$ are hydrogen, lithium, sodium, potassium or alkyl groups.)

7 Claims, 2 Drawing Figures

MAGNETIC RECORDING MEDIUM

TECHNICAL FIELD

The present invention relates to a magnetic recording medium and, more particularly, to a magnetic recording material such as a magnetic tape which has improved durability and surface properties.

BACKGROUND ART

With rapid advance in the field of magnetic recording, further improvements in magnetic recording media are demanded than ever before. High reproduction output is required in short-wave recording, especially in a VTR magnetic recording medium. In view of this, finely dividing of magnetic particles is used to improve the S/N ratio and to make the surface of the magnetic layer smoother. However, when the magnetic powder consists of such fine particles, the coating viscosity increases during the manufacture thereof. This results in an additional problem of a degraded dispersibility of the magnetic powder.

The problem involved in an increase in the viscosity of the magnetic coating is not limited to the degradation in the dispersibility of the magnetic powder. For example, in the coating transfer step during the manufacture of the magnetic recording medium, the transfer of the coating cannot be smoothly performed. This tends to cause local retention of the coating in the transport path and to result in hardening of the coating. This may also lead to drop-out when the coating is used to form a magnetic layer. When such a coating is coated, the coating cannot be easily smoothed after being transferred onto a nonmagnetic support. As a result, a good surface property cannot be obtained. Furthermore, an increase in the viscosity of the coating provides a disadvantageous condition for a thin layer coating which has currently been developed. Thus, there are a wide range of problems which may be encountered with an increase in the viscosity of the coating in the process from the manufacture of magnetic coating to the formation of magnetic layer.

When the magnetic powder is finely divided, i.e., when the specific surface area of the powder increases, the contact interface between the magnetic powder and a coating or a binder increases. This means that an increased energy is required for dispersing the magnetic powder. This problem can be partially resolved by improving a mixing/dispersing unit. However, the degree of such an improvement is limited. In view of this, the conventional method has used a surfactant which also improves the dispersibility. However, with this method, when the amount of the surfactant added is increased for improving the dispersibility, the properties of the layer tend to be impaired. For this reason, this method has not been ideal when high-density recording and high durability which are required for current magnetic recording media, are consiered.

DISCLOSURE OF INVENTION

It is an object of the present invention to provide a magnetic recording medium wherein a resin having a polar group and a good dispersibility is mixed with a magnetic powder, in a specific molar ratio to attain a specific surface area so that any increase in a resultant coating and a degradation in the dispersibility of the magnetic powder are prevented, a rubbing-off in a drive mechanism (VTR) is prevented, and durability is improved.

In order to achieve the above object of the present invention, there is provided a magnetic recording medium having on a nonmagnetic support a magnetic layer consisting mainly of a acicular iron oxide magnetic powder and a binder, characterized in that the iron oxide magnetic powder has a specific surface area as determined by the BET method, of not less than 35 $m^2/g$, and the binder contains a resin which has a molecular weight of not more than 50,000 and at least one polar group selected from the group consisting of polar groups having the general formulas:

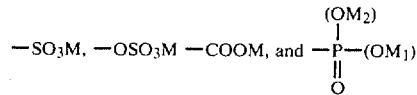

(wherein M is hydrogen, lithium, sodium or potassium; and $M_1$ and $M_2$ are hydrogen, lithium, sodium, potassium or alkyl groups).

BEST MODE OF CARRYING OUT THE INVENTION

Figure 1:
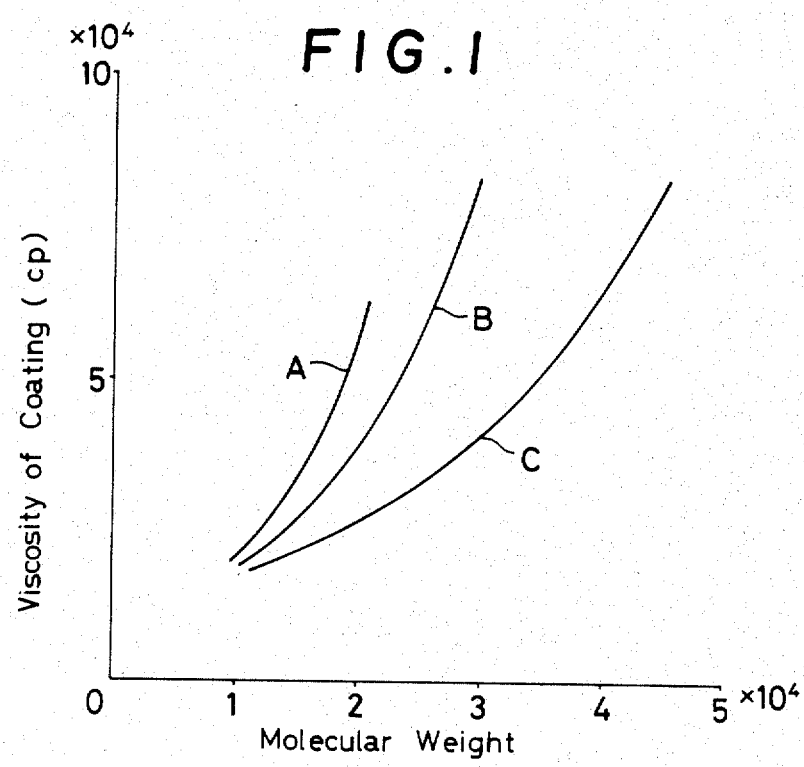
FIG. 1 is a graph showing the relationship between the molecular weight of a polyurethane resin and the coating viscosity of a magnetic recording medium according to the present invention, using the specific surface area of the magnetic powder as a parameter.

An iron oxide-based magnetic powder to be used herein may be $\gamma$-$Fe_2O_3$, a weakly reduced $\gamma$-$Fe_2O_3$ (a mixed crystal of $\gamma$-$Fe_2O_3$ and $Fe_3O_4$), or a Co-coated iron oxide in which a Co compound is deposited to the surface of such an iron oxide magnetic powder. The $\gamma$-$Fe_2O_3$ and the weakly reduced $\gamma$-$Fe_2O_3$ can be prepared by various methods. However, the following method is employed, in general. More specifically, a water-containing goethite or lepidocrocite as a starting material is reduced into a magnetite, which is oxidized to provide a desired, ferromagnetic $\gamma$-$Fe_2O_3$ or weakly reduced $\gamma$-$Fe_2O_3$ of the acicular crystal-type. The Co-coated iron oxide is prepared by suspending in water the $\gamma$-$Fe_2O_3$ or weakly reduced $\gamma$-$Fe_2O_3$ thus prepared, adding to the suspension a Co compound such as cobalt chloride and an excess amount of an alkali such as NaOH so as to deposit the Co compound onto the surfaces of the $\gamma$-$Fe_2O_3$ particles, recovering the particles from the suspension water, and, if required, heat-treating the particles at a relatively low temperature of about 120° C.

In accordance with the present invention, the specific surface area of the oxide iron magnetic powders as measured according to the BET method is selected to be not less than 35 $m^2/g$. This is because, when the specific surface area is less than 35 $m^2/g$, a satisfactory improvement in the S/N ratio cannot be expected. Ferromagnetic particles having a specific surface area of not less than 35 $m^2/g$ can be obtained by properly selecting the size or specific surface area of the water-containing oxide iron particles as the starting material.

In accordance with the present invention, in order to improve the dispersibility of the magnetic powder, a resin is used which has at least one polar group selected from the group consisting of polar groups having the general formulas:

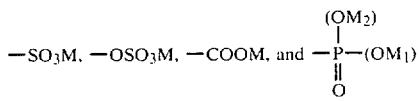

(wherein M is hydrogen, lithium, sodium or potassium; and $M_1$ and $M_2$ are hydrogen, lithium, sodium, potassium or alkyl groups). More than one polar group may be included in the resin, and resins having different polar groups can be used in admixture. In the general formulas as described above, the alkyl groups are preferably saturated straight or branched chain aliphatic hydrocarbon residues to 23 carbon atoms. Examples of such alkyl groups include a tricosyl group, docosyl group, eicosyl group, nonadecyl group, octadecyl group, hexadecyl group, tridecyl group, undecyl group, decyl group, nonyl group, octyl group, hexyl group, pentyl group, butyl group, t-butyl group, propyl group, isopropyl group, ethyl group, and methyl group. Note that $M_1$ and $M_2$ may be the same or different.

The resin having a polar group as described above can be prepared by introducing a polar group into a polyester resin, a polyurethane resin or a vinyl chloride-based resin. Various methods may be used to introduce the polar group into such a resin. For example, in the case of the polyester resin, there may be adopted a method wherein a dicarboxylic acid having a polar group is used as part of a dicarboxylic acid component to be used as a starting material of the polyester, and such a dicarboxylic acid having a polar group and a dicarboxylic acid without a polar group are subjected to the condensation reaction with a diol. In the case of the polyurethane resin, there may be employed a method wherein these three types of polyester resin starting materials and a diisocyanate are subjected to the condensation reaction and the addition reaction. When a polyester resin, a polyurethane resin and a vinyl chloride-based resin are modified, there may be adopted a method wherein a polar group is introduced by dehydrochlorination reaction between the active hydrogen group contained in these resins and a chlorine-containing compound such as Cl—$CH_2CH_2SO_3M$, Cl—$CH_2CH_2OSO_3M$, Cl—$CH_2COOM$, or

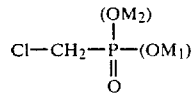

Examples of dicarboxylic acid components which have no polar group for polyester resins which may be used herein include aromatic dicarboxylic acids such as terephthalic acid, isophthalic acid, orthophthalic acid, or 1,5-naphthalic acid; aromatic hydroxycarboxylic acids such as p-hydroxybenzoic acid or p-(hydroxyethoxy)benzoic acid; aliphatic dicarboxylic acids such as succinic acid, adipic acid, azelaic acid, sebacic acid, or dodecane dicarboxylic acid; or tri- or tetracarboxylic acids such as trimellitic acid, trimesic acid, or pyromellitic acid. Therephathalic acid, isophthalic acid, adipic acid, and sebacic acid are particularly preferable. Dicarboxylic acid components having metal sulfonate groups may include 5-sodium sulfoisophthalate, 2-sodium sulfoterephthalate, or 2-potassium sulfoterephthalate.

Diol components which may be used in the present invention for preparing a polyester resin may, for example, be ethylene glycol, propylene glycol, 1,3-propanediol, 1,4-butanediol, 1,5-pentanediol, 1,6-hexanediol, neopentyl glycol, diethylene glycol, dipropylene glycol, 2,2,4-trimethyl-1,3-pentanediol, 1,4-cyclohexanedimethanol, an ethylene oxide adduct of bisphenol A, an ethylene oxide adduct and propylene oxide adduct of hydrogenated bisphenol A, polyethylene glycol, polypropylene glycol, polytetramethylene glycol, or the like. Additionally, tri- or tetraols such as trimethylolethane, trimethylolpropane, glycerin, or pentaerythritol may be used.

Diisocyanate components for a polyurehtane resin which may be used herein may be 2,4-tolylenediisocyanate, 2,6-tolylenediisocyanate, p-phenylenediisocyanate, diphenylmethanediisocyanate, m-phenylenediisocyanate, hexamethylenediisocyanate, tetramethylenediisocyanate, 3,3'-dimethoxy-4,4'-biphenylenediisocyanate, 2,4-naphthalenediisocyanate, 3,3'-dimethyl-4,4'-biphenylenediisocyanate, 4,4'-diphenylenediisocyanate, 4,4'-diisocyanate-diphenyl ether, 1,3-naphthalenediisocyanate, p-xylylenediisocyanate, m-xylylenediisocyanate, 1,3-diisocyanatemethylcyclohexane, 1,4-diisocyanatemethylcyclohexane, 4,4'-diisocyanatedicyclohexylmethane, isophoronediisocyanate, or the like.

When a metal sulfonate group is introduced by way of the modification of vinyl chloride-based resins, a vinyl chloride-based resins may be a vinyl chloride-vinyl acetate-vinyl alcohol copolymer, vinyl chloride-vinyl propionate-vinyl alcohol copolymer, vinyl chloride-vinyl acetate-vinyl maleate-vinyl alcohol copolymer, vinyl chloride-vinyl propionate-vinyl maleate-vinyl alcohol copolymer, or the like. The OH group of the vinyl alcohol contained in such a vinyl chloride-based resin is reacted with chlorine of a metal sulfonate containing chlorine such as Cl—$CH_2CH_2SO_3M$ or Cl—$SO_3M$ in an organic polar solvent such as dimethylformamide or dimethylsulfoxide in the presence of dehydrochlorinating agents such as amines, e.g., pyridine, picoline or triethylamine, or ethylene oxide or propylene oxide.

According to the present invention, the resin having a polar group as described above is contained in the binder in an amount of not less than 30% by weight based on the total binder content. When the amount of the resin is less than this value, a satisfactory dispersion effect cannot be obtained. A binder to be used in combination with such a resin may be any binder which is generally used as a binder. Examples of such binders include nitrocellulose, a vinyl chloride-vinyl acetate copolymer, vinyl chloride-vinyl acetate-vinyl alcohol copolymer, vinyl chloride-vinyl propionate copolymer, vinylidene chloride-vinyl chloride copolymer, vinylidene chloride-acrylonitrile copolymer, acrylonitrile-butadiene copolymer, acetal resin, butyral resin, formal resin, polyester resin, polyurethane resin, polyamide resin, epoxy resin, phenoxy resin, or mixtures thereof.

In the present invention a resin having a polar group to be used has a molecular weight up to 50,000. If the molecular weight of the resin exceeds 50,000, when the specific surface area as determined by the BET method, of a magnetic powder as shown in FIG. 1 becomes large, the viscosity of coating becomes too high, exceeding an acceptable value. The resin preferably has a molecular weight of not less than 2,000. If the molecular weight of the resin is less than 2,000, when the magnetic coating is applied on a support and is hardened with a hardener, an unreacted portion is produced, providing a low molecular weight, residual component. This will degrade the physical properties of the coating layer. The molecular weight of the resin having a polar group is particularly preferably not less than 10,000. In this resin, the molecular wieght per polar group preferably falls within a range of 2,000 to 50,000. When the molecular weight per polar group exceeds 50,000, an improvement in dispersibility cannot be expected. On the other hand, when the molecular weight per polar group is less than 2,000, the resin is difficult to dissolve in a non-polar solvent.

To a magnetic layer may further be added aluminum oxide, chromium oxide, silicon oxide or the like as a reinforcing agent; olive oil or the like as a lubricant; carbon black or the like as an antistatic agent; or lecithin or the like as a dispersant.

The magnetic layer is generally formed by dissolving components of the magnetic layer in an organic solvent to prepare a magnetic coating, and then by applying the magnetic coating on a nonmagnetic support. Suitable organic solvents which may be used herein are, for example, ketones (e.g., acetone, methyl ethyl ketone, methyl isobutyl ketone, or cyclcohexanone), alcohols (e.g., methanol, ethanol, propanol, or butanol), esters (e.g., methyl acetate, ethyl acetate, butyl acetate, ethyl lactate, or glycol acetate), monoethyl ether, glycol ethers (e.g., ethylene glycol dimethyl ether, ethylene glycol monoethyl ether, or dioxane), aromatic hydrocarbons (e.g., benzene, toluene, or xylene), aliphatic hydrocarbons (e.g., hexane or heptane), nitropropane or the like. Nonmagnetic supports on which a magnetic coating is applied may be materials such as polyesters (e.g., polyethyelen terephthalate), polyolefins (e.g., a polypropylene), cellulose derivatives (e.g., cellulose triacetate or cellulose diacetate), polycarbonate, polyvinyl chloride, polyimide, polyamide, polyhydrazide, metals (e.g., aluminum or copper), paper, or the like.

The present invention will now be described by way of the following examples.

EXAMPLE 1

| | |
|---|---|
| Co-coated iron oxide magnetic powder (specific surface area: 45 m$^2$/g) | 100 parts by weight |
| Vinyl chloride-vinyl acetate-vinyl alcohol copolymer (VAGH: manufactured by U.C.C.) | 12.5 parts by weight |
| Polyurethane resin containing sodium sulfonate group (molecular weight: 25,000; molecular weight per —SO$_3$Na: 25,000) | 12.5 parts by weight |
| Carbon black (antistatic agent) | 5 parts by weight |
| Cr$_2$O$_3$ particles (abrasive) | 5 parts by weight |
| Olive oil (lubricant) | 2 parts by weight |
| Solvent | 220 parts by weight |
| methyl ethyl ketone | 100 parts by weight |
| methyl isobutyl ketone | 60 parts by weight |
| toluene | 60 parts by weight |

The composition described above was mixed and dispersed in a ball mill for 48 hours to prepare a magnetic coating. Thereafter, an isocyanate compound ("Desmodur L": manufactured by Bayer Co., Ltd.) was added to the mixture in an amount of 5 parts by weight. After the mixture was applied on a polyester film having a thickness of 15 μm to a dried thickness of about 6 μm, the coating film was subjected to a surface treatment by calendering. The film was cut into a width of ½ inch to prepare a magnetic tape.

EXAMPLES 2–7 AND COMPARATIVE EXAMPLE

Magnetic tapes were prepared using the compositions described below for Examples 2 to 7 and Comparative Example. In the respective compositions, since the types and amounts of the antistatic agent, abrasive, lubricant and solvent were the same as those of Example 1, they are not shown in the following compositions.

EXAMPLE 2

| | |
|---|---|
| Co-coated iron oxide magnetic powder (specific surface area: 45 m$^2$/g) | 100 parts by weight |
| Vinyl chloride-vinyl acetate-vinyl alcohol copolymer (VAGH: manufactured by U.C.C.) | 12.5 parts by weight |
| Polyurethane resin containing sodium sulfonate group (molecular weight: 15,000; molecular weight per —SO$_3$Na: 15,000) | 12.5 parts by weight |

EXAMPLE 3

| | |
|---|---|
| Co-coated iron oxide magnetic powder (specific surface area: 60 m$^2$/g) | 100 parts by weight |
| Vinyl chloride-vinyl acetate-vinyl alcohol copolymer (VAGH: manufactured by U.C.C.) | 10 parts by weight |
| Polyurethane resin containing sodium sulfonate group (molecular weight: 25,000; molecular weight per —SO$_3$Na: 25,000) | 10 parts by weight |

EXAMPLE 4

| | |
|---|---|
| Co-coated iron oxide magnetic powder (specific surface area: 75 m$^2$/g) | 100 parts by weight |
| Vinyl chloride-vinyl acetate-vinyl alcohol copolymer (VAGH: manufactured by U.C.C.) | 10 parts by weight |
| Polyurethane resin containing sodium sulfonate group (molecular weight: 25,000; molecular weight per —SO$_3$Na: 25,000) | 12.5 parts by weight |

EXAMPLE 5

| | |
|---|---|
| Co-coated iron oxide magnetic powder (specific surface area: 75 m$^2$/g) | 100 parts by weight |
| Vinyl chloride-vinyl acetate-vinyl alcohol copolymer (VAGH: manufactured by U.C.C.) | 12.5 parts by weight |
| Polyurethane resin containing sodium sulfonate group (molecular weight: 15,000; molecular weight per —SO$_3$Na: 15,000) | 12.5 parts by weight |

EXAMPLE 6

| | |
|---|---|
| Co-coated iron oxide magnetic powder (specific surface area: 45 m$^2$/g) | 100 parts by weight |
| Polyurethane resin containing sodium sulfonate group (molecular weight: 25,000; molecular weight per —SO$_3$Na: 25,000) | 25 parts by weight |

EXAMPLE 7

| | |
|---|---|
| Co-coated iron oxide magnetic powder (specific surface area: 45 m$^2$/g) | 100 parts by weight |
| Polyurethane resin containing sodium sulfonate group (molecular weight: 20,000; molecular weight per —SO$_3$Na: 10,000) | 25 parts by weight |

COMPARATIVE EXAMPLE

| | |
|---|---|
| Co-coated iron oxide magnetic powder (specific surface area: 45 m$^2$/g) | 100 parts by weight |
| Vinyl chloride-vinyl acetate-vinyl alcohol copolymer (VAGH: manufactured by U.C.C.) | 12.5 parts by weight |
| Thermoplastic polyurethane resin ("N-2304": manufactured by Nippon polyurethane Kogyo K.K.) | 12.5 parts by weight |

The table below shows the measurements of the various properties of the magnetic tapes obtained in Examples 1 to 7 and Comparative Example.

TABLE
Properties of the Magnetic Tapes

| | Specific surface area of magnetic powder (m$^2$/g) | Viscosity of coating (cp) | Squareness ratio (%) | Durability (minutes) | Rubbing-off | Y-S/N |
|---|---|---|---|---|---|---|
| Example 1 | 45 | 4,000 | 88 | 200 | −0.5 | +4.0 |
| Example 2 | 45 | 3,000 | 90 | 190 | −0.5 | +4.0 |
| Example 3 | 60 | 5,000 | 87 | 180 | −0.75 | +3.5 |
| Example 4 | 75 | 6,000 | 85 | 170 | −1.0 | +3.0 |
| Example 5 | 75 | 5,000 | 86 | 160 | −1.0 | +3.0 |
| Example 6 | 45 | 2,500 | 91 | 300 | −0.5 | +4.0 |
| Example 7 | 45 | 2,300 | 90 | 60 | −0.5 | +4.0 |
| Comparative Example | 45 | 15,000 | 75 | 30 | −4.0 | 0 |

The viscosity of coating was measured at 30 rotations with a No. 4 rotor using a Brookfield rotational viscometer. The rubbing-off rating is the rubbing-off onto a drive system (guide roll or the like) after running the tape, which is evaluated in accordance with the low-point system of scoring (-5 (poor)-0 (good)). The Y-S/N represents the S/N ratio which is obtained when a monochrome image is recorded on a sample and reproduced therefrom. The durability is a time to take for an output signal to decrease to a predetermined level when the same position on a magnetic tape is scanned with a home VTR.

Figure 2:
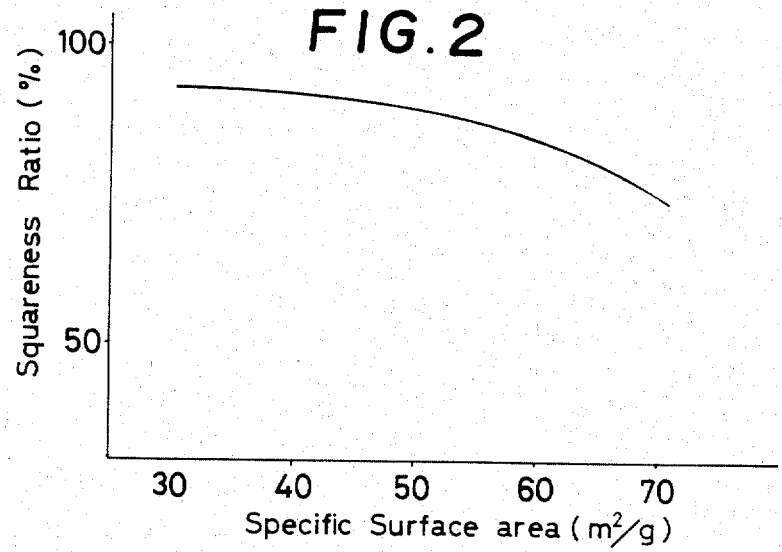
FIG. 2 is a graph showing the relationship between the specific surface area of the magnetic powder and the squareness ratio of the magnetic layer.

FIG. 1 shows the relationship between the molecular weight and the viscosity of coating when the molecular weight of a polyurethane resin containing a sodium sulfonate group is varied in Example 6, taking a specific surface area of the magnetic powder (75 m$^2$/g: curve A, 60 m$^2$/g: curve B, 45 m$^2$/g: curve C) as a parameter. FIG. 2 similarly shows the relationship between the specific surface area and the squareness ratio of the magnetic tape when the specific surface are of the Co-coated iron oxide magnetic powder is varied in Example 6.

It is apparent from the table above that in accordance with the present invention, there is provided a magnetic recording medium which has good squareness ratio, durability, and S/N ratio.

We claim:

1. A magnetic recording medium having on a non-magnetic support a magnetic recording layer consisting mainly of an acicular iron oxide magnetic powder and a binder, characterized in that said iron oxide magnetic powder has a specific surface area as determined by the BET method, of not less than 45 m$^2$/g, and said binder contains not less than 30% by weight of a resin which has a molecular weight of not more than 50,000 and at least one polar group selected from the group consisting of polar groups having the general formulas:

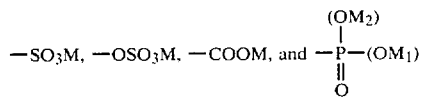

(wherein M is hydrogen, lithium, sodium, or potassium; and M$_1$ and M$_2$ are hydrogen, lithium, sodium, potassium or alkyl groups).

2. A magnetic recording medium according to claim 1, characterized in that the alkyl group has up to 23 carbon atoms.

3. A magnetic recording medium according to claim 1, characterized in that said iron oxide magnetic powder is γ-Fe$_2$O$_3$, a weakly reduced γ-Fe$_2$O$_3$, a Co-Coated γ-Fe$_2$O$_3$ or a weakly reduced Co-coated γ-Fe$_2$O$_3$.

4. A magnetic recording medium according to claim 1, characterized in that a main chain of said resin having the polar group is a polyester, polyurethane or a vinyl chloride-based copolymer.

5. A magnetic recording medium according to claim 1, characterized in that the molecular weight of said resin having the polar group is 2,000 to 50,000.

6. A magnetic recording medium according to claim 1, characterized in that the molecular weight of said resin having the polar group is 10,000 to 50,000.

7. A magnetic recording medium according to claim 1, characterized in that said resin having the polar group has a molecular weight of 2,000 to 50,000 per polar group.

* * * * *